United States Patent Office 3,786,070
Patented Jan. 15, 1974

3,786,070
PROCESS FOR PREPARATION OF CIS-CHRYSANTHEMIC ACIDS
Jacques Martel, Bondy, and Jean Buendia, Fontenay-sous-Bois, France, assignors to Roussel-UCLAF, Paris, France
No Drawing. Filed Mar. 2, 1970, Ser. No. 15,945
Claims priority, application France, Mar. 4, 1969, 6905865
Int. Cl. C07d 7/18
U.S. Cl. 260—343.2 R         9 Claims

ABSTRACT OF THE DISCLOSURE

A process for the preparation of racemic cis chrysanthemic acid or of the (1R,2S) configuration or of the (1S,2R) configuration beginning respectively from racemic trans 3,3-dimethyl-2-(2'-hydroxy-2'-methylpropyl)-cyclopropane1-carboxylic acid or of the (1S,2S) configuration or of the (1R,2R) configuration.

STATE OF THE ART d-Cis chrysanthemic (1R,2S) acid has a great industrial interest as its ester with 5-benzyl-3-furylmethanol possesses remarkable insecticidal properties as discussed in our commonly assigned application Ser. No. 9,081, filed Feb. 5, 1970, entitled Novel Esters and Their Preparation, now abandoned. For example, the 5-benzyl-3-furylmethyl ester of d-cis chrysanthemic-(1R,2S)-acid has a lethal activity against flies 11.5 times greater than natural pyrethrins. Certain esters of 1-cis chrysanthemic (1S,2R) acid such as its allethrolone ester possess equally on their part a non-negligible insecticidal activity. There exist procedures for obtaining cis chrysanthemic acid in its racemic or optically active states starting with di-cis trans chrysanthemic acid prepared synthetically as in French Pat. No. 1,536,458, but these procedures are relatively long and costly.

OBJECTS OF THE INVENTION

It is an object of the invention to provide an economical process for the preparation of cis chrysanthemic acids.

It is another object of the invention to provide intermediate compounds.

These and other objects and advantages of the invention will become obvious from the following detailed description.

THE INVENTION

The process of the invention for the preparation of cis chrysanthemic acids in their racemic state or their optically active isomers comprises forming an alkyl ester of a racemic mixture or an optically active isomer of trans 3,3-dimethyl-2-(2'-hydroxy-2'-methylpropyl)-cyclopropane 1-carboxylic acid wherein the alkyl has 1 to 4 carbon atoms, subjecting resulting alkyl ester to the action of a basic agent to form the lactone of cis 3,3-dimethyl-2-(2'-hydroxy-2'-methylpropyl) - cyclopropane-1-carboxylic acid having the inverse configuration in position 1 to the said alkyl ester, and reacting the said lactone with a Lewis acid in the presence of a tertiary base to form cis chrysanthemic acid in its racemic form or of the configuration (1R,2S) or of the configuration (1S,2R) depending upon whether the starting compound is racemic or of the configuration (1S,2S) or of the configuration (1R,2R).

The esterification is a classical reaction and may be realized by reacting trans 3,3-dimethyl-2-(2'-hydroxy-2'-methylpropyl)-cyclopropane-1-carboxylic acid with an alkanol of 1 to 4 carbon atoms in the presence of an acid such as sulfuric acid or p-toluene sulfonic acid. Suitable alkanols are methanol, propanol, and butanol, isopropanol, etc.

The esterification agent used can also be the diazoalkane corresponding to the desired ester and the reaction can be effected in an organic solvent such as methylene chloride, chloroform or dichloroethane. It is also possible to use the dialkyl sulfate of the desired ester and the reaction is effected in the presence of a basic agent such as sodium bicarbonate.

Other equally convenient esterification methods may be used such as using as the esterification agent, the dialkyl-ketal of dimethylformamide of the desired ester [Brechbuhler et al., Ang. Chem., vol. 75 (1963), p. 296] or for the methyl ester, methanol in the presence of dimethyl-ketal of acetone [Lorette et al., J. Org. Chem., vol. 24 (1959), p. 261].

The two following steps are particularly characteristic of the process of the invention. It acts first in the transformation of the alkyl ester of trans 3,3-dimethyl-2-(2'-hydroxy-2'-methylpropyl) - cyclopropane - 1 - carboxylic acid into the lactone of cis 3,3-dimethyl-2-(2'-hydroxy-2'-methylpropyl)-cyclopropane-1-carboxylic acid with inversion of the configuration of the center 1. The change of the trans ester into the epimer compound of cis structure was realized to be a priori difficult. In effect, the chrysanthemic acid or analogous series, the compounds of the transconfiguration had greater thermodynamic stability than the corresponding compounds of the cis configuration and it was expected that the transformation of cis to trans would be favored on the detriment of the inverse transformation.

However, it has now been found that it is possible to arrive at the desired result by treating the trans ester with a basic reactant. The action of the basic agent effects the inversion of the center 1 leading thus to a compound of cis configuration which is stabilized in the form of a lactone. The equilibrium reaction is displaced in favor of the cis-lactone so that it is obtained in good yields.

Examples of suitable basic agents to transform the trans ester into the cis lactone are alkali metal amides such as sodium amide; alkali metal hydrides such as sodium hydride; alkali metal alcoholates such as sodium methylate, sodium ethylate or potassium tert.-butylate. The said transformation is effected in an organic solvent such as benzene, toluene, dioxane, the dimethyl ether or ethylene glycol, etc.

A preferred mode of the process step for the transformation of the trans ester into the cis lactone uses potassium tert.-butylate as the base and benzene as the solvent and reaction media is anhydrous.

The second particularly characteristic step of the process consists of transforming the cis lactone thus prepared into the corresponding cis chrysanthemic acid. This transformation is difficult to effect although it has been accomplished in the racemic series by Harpers et al. [J. Sci. Food Agric., vol. 3 (1952), p. 230] by heating the cis lactone in a 5% aqueous sulfuric acid solution. The yield is small and the cis chrysanthemic acid is impure because the aqueous solution of a protonic acid such as sulfuric acid has an unfavorable effect on the equilibrium between the cis lactone and cis chrysanthemic acid.

It has now been found that the conversion of the lactone of cis 3,3-dimethyl-2-(2'-hydroxy-2'-methylpropyl)-cyclopropane-1-carboxylic acid to cis chrysanthemic acid can be prepared in good yields by reacting the cis lactone with a Lewis acid in the presence of a tertiary base which binds the free acid as it is formed. The yield of the cis acid formed by this process is much higher than that which resulted from the equilibrium of the cis lactone and the cis acid in an aqueous solution of a protonic acid such as sulfuric acid.

The preferred Lewis acid is molten magnesium bromide hexahydrate and the tertiary base may be triethylamine, tripropylamine, quinine, etc., but preferably pyridine. The reaction of the magnesium bromide with the cis lactone in the presence of a tertiary base results in a complex of cis chrysanthemic acid and magnesium bromide which complex is decomposed by the action of a 1:1 mixture of dioxane and an aqueous 5 N hydrochloric acid solution to free cis chrysanthemic acid. The said acid can be purified by forming a salt with an optically active base such as quinine or 2-phenylethylamine.

Racemic trans 3,3 - dimethyl-2-(2'-hydroxy-2'-methylpropyl)-cyclopropane-1-carboxylic acid or of the configuration (1S, 2S) or of the configuration (1R, 2R), the starting materials for the process, can be prepared by treating the corresponding trans chrysanthemic acid with dilute aqueous sulfuric acid as taught by Harpers et al. [J. Sci. Food Agric., vol. 3 (1952), p. 230]. The optically active isomers of the starting trans acid can be prepared by resolution of dl-trans chrysanthemic acid or a mixture of dl-cis trans chrysanthemic acid with a resolution agent by classical techniques.

The process of the invention allows the transformation of l-trans chrysanthemic-(1S,2S) acid to d-cis chrysanthemic-(1R,2S) acid whose 5-benzyl-3-furylmethyl ester has a high degree of insecticidal activity.

In the following example, there are described several preferred embodiments to illustrate the invention. However, it should be understood that the invention is not intended to be limited to the specific embodiments.

EXAMPLE

Preparation of d-cis chrysanthemic acid

Step A: Trans 3,3-dimethyl-2S-(2'-hydroxy-2'-methylpropyl)-cyclopropane-1S-carboxylic acid.—1 gm. of sodium lauryl sulfate and 15 gm. of l-trans chrysanthemic acid or trans 3,3-dimethyl-2S-(2'-methyl-1'-propenyl)-cyclopropane-1S-carboxylic acid with a specific rotation of $[\alpha]_D^{20} = -14.5°$ (c.=1.2% in ethanol) [Campbell et al., J. Sci. Food Agric., vol. 3, 1952, p. 189] were introduced into 750 cc. of a solution containing 5 gm. of sulfuric acid in 100 cc. of water and the reaction mixture was then heated to reflux and held there for 3½ hours. The mixture was then cooled and the aqueous phase was extracted with petroleum ether (boiling point: 35–70° C.) and the organic phase was washed with a saturated aqueous sodium chloride solution. The unreacted starting l-trans chrysanthemic acid was dissolved in the organic phase which by concentration to dryness gave 6.55 gm. of l-trans chrysanthemic acid which could be reused.

The aqueous mother liquors were added to the wash water saturated with sodium chloride and the resulting aqueous phase was extracted with ethyl ether. The ether extracts were washed with a saturated aqueous sodium chloride solution, then were dried and concentrated to dryness to obtain 9.3 gm. of trans 3,3-dimethyl-2S-(2'-hydroxy-2'-methylpropyl)-cyclopropane - 1S - carboxylic acid with a melting point of 72–73° C. and a specific rotation $[\alpha]_D^{20} = +28°$ (c.=0.66% in chloroform).

This compound is described by Harper et al., Journ. Sci. Food Agric., vol. 3 (1952), p. 230.

Step B: Methyl ester of trans 3,3-dimethyl-2S-(2'-hydroxy-2'-methylpropyl)-cyclopropane - 1S - carboxylic acid.—8.1 gm. of trans 3,3-dimethyl-2S-(2'-hydroxy-2'-methylpropyl)-cyclopropane-1S-carboxylic acid were dissolved in 20 cc. of methylene chloride and after cooling the resulting solution to 0° C., there was added thereto with stirring a methylene chloride solution containing 2% of diazomethane in sufficient quantity to observe no more effervescence and the reaction mixture had a persistent slight yellow coloration. The reaction mixture was stirred for 5 minutes at 0° C. and excess diazomethane was destroyed by the addition of alumina to the reaction solution and then the alumina was removed by filtration. The filtrate was concentrated to dryness and the residue was purified by chromatography over silica gel with elution with a mixture of benzene and ethyl acetate (9:1) to recover 7.65 gm. of the methyl ester of trans 3,3-dimethyl-2S-(2'-hydroxy - 2' - methylpropyl)-cyclopropane-1S-carboxylic acid with a specific rotation of $[\alpha]_D^{20} = +28.5°$ (c.=0.77/ in CCl$_4$) and a refractive index $[n]_D^{20} = 1.4600$.

The methyl ester of trans 3,3-dimethyl-2S-(2'-hydroxy-2'-methylpropyl)-cyclopropane - 1S - carboxylic acid was also prepared by the following method:

5 gm. of trans 3,3-dimethyl-2S-(2'-hydroxy-2'-methylpropyl)-cyclopropane-1S-carboxylic acid were dissolved at 20° C. in 100 cc. of methanol containing 1 gm. of sulfuric acid. After standing for 48 hours at 20° C., the reaction mixture was added to water containing sufficient ammonia to neutralize the existing acidity. The mixture was extracted with methylene chloride and the methylene chloride phase was washed with water and evaporated to dryness under vacuum to obtain 5 gm. of methyl ester of trans 3,3 - dimethyl - 2S - (2' - hydroxy-2'-methylpropyl)-cyclopropane-1S-carboxylic acid, identical to the product described above.

Step C: Lactone of cis 3,3-dimethyl-2S-(2'-hydroxy-2'-methylpropyl)-cyclopropane 1R-carboxylic acid.—25 cc. of benzene and 3.11 gm. of the methyl ester of trans 3,3 - dimethyl - 2S - (2'-hydroxy-2'-methylpropyl)-cyclopropane-1S-carboxylic acid were introduced into a balloon flask equipped with a system for decanting water and stuffed with siliporite (dehydrated alkali metal alumina silicates capable of fixing water) and the mixture was heated to reflux and held there for one hour to completely dehydrate the solution. Under a nitrogen atmosphere, 1.835 gm. of potassium tert.-butylate (titrating 95%) were added thereto and the mixture was held at reflux for 30 minutes. After cooling, the reaction mixture was added to an ice-water mixture and the aqueous phase was extracted with ethyl ether. The ether extracts were combined, washed with water, were dried and concentrated to dryness. The residue was purified by empasting with petroleum ether (boiling point of 35–70° C.), was dried to obtain 1.625 gm. of the lactone of cis 3,3-dimethyl-2S-(2' - hydroxy - 2' - methylpropyl)-cyclopropane-1R-carboxylic acid melting at 83° C. and having a specific rotation $[\alpha]_D^{20} = +73.5°$ (c.=1.2% in chloroform). By acidification of aqueous mother liquors, extraction with ethyl ether and evaporation of the solvent, there were obtained 0.465 gm. of trans 3,3-dimethyl-2S-(2'-hydroxy-2'-methylpropyl)-cyclopropane-1S-carboxylic acid.

The said lactone obtained in this step is described by Harper et al., J. Sci., Food Agric., vol. 3 (1952), p. 230.

Step D: Cis 3,3-dimethyl-2S-(2'-methyl-1'-propenyl)-cyclopropane-1R-carboxylic acid or d-cis chrysanthemic acid.—0.65 cc. of pyridine and 1 gm. of the lactone of cis 3,3-dimethyl-2S-(2'-hydroxy-2'-methylpropyl)-cyclopropane-1R-carboxylic acid were introduced into 1.1 gm. of melted magnesium bromide hexahydrate and the reaction mixture was heated to 125° C. and maintained there for 14 hours. After cooling, a mixture of aqueous 2 N hydrochloric acid solution and ethyl ether were added thereto and after stirring, the precipitate formed was isolated by vacuum filtering. The precipitate was washed and dried to obtain 0.705 gm. of a bromomagnesium complex of d-cis chrysanthemic acid melting at 200–230° C. (pasty fusion) [Product A].

The ether phase was separated by decantation and the aqueous mother liquors were extracted with ether. The combined ether phases were successively washed with a dilute aqueous sodium hydroxide solution and then a saturated aqueous sodium chloride solution. The solution was then dried and concentrated to dryness to obtain 0.183 gm. of the lactone of cis 3,3-dimethyl-2S-(2'-hydroxy - 2' - methylpropyl)-cyclopropane-1R-carboxylic acid melting at 82° C. which could be reused.

By acidifying the alkaline wash water, extraction thereof with ethyl ether, washing of the ether extracts with water, drying and concentrating to dryness, there was obtained 0.213 gm. of raw d-cis chrysanthemic acid [product B].

0.705 gm. of product A were added to a 1:1 mixture of an aqueous 5 N hydrochloric acid solution and dioxane and the mixture was stirred for 15 minutes at room temperature. The reaction mixture was extracted with ethyl ether and the ether extracts were washed with water, dried and concentrated to dryness to obtain 0.486 gm. of raw d-cis chrysanthemic acid [product C].

Products B and C were combined and dissolved in 1.2 cc. of ethanol and a hot solution of 1.43 gm. of 1-quinine in 2.4 cc. of ethanol was added to the resulting solution. After dilution with 0.6 cc. of water, the reaction mixture was heated to reflux and cooled to room temperature. The crystals were recovered by vacuum filtration and dried. The product subjected to two successive crystallizations from ethanol containing 25% water to obtain 1.31 gm. of the 1-quinine salt of d-cis chrysanthemic acid melting at 122–124° C. The 1.31 gm. of the said salt were added to a mixture of 15 cc. of an aqueous 2 N hydrochloric acid solution and 1.5 cc. of ethyl ether and the mixture was stirred for 10 minutes. The mixture was extracted with ethyl ether and the ether extracts were washed with water, dried and concentrated to dryness to obtain 0.445 gm. of d-cis chrysanthemic acid melting at 40° C. (not clear) and having a specific rotation $[\alpha]_D^{20} = +39.5°$ (c.=1.2% in ethanol). The said compound is identical to that described by Campbell et al., J. Sci. Food Agric., vol. 3, (1952), p. 189.

Various modifications of the process of the invention may be made without departing from the spirit or scope thereof and it is to be understood that the invention is not to be limited except as defined in the appended claims.

We claim:

1. A process for the preparation of a racemate or an optically active isomer of cis chrysanthemic acid which comprises forming an alkyl ester of a racemic mixture or an optically active isomer of trans 3,3-dimethyl-2-(2'-hydroxy - 2' - methylpropyl)-cyclopropane-1-carboxylic, wherein the alkyl has 1 to 4 carbon atoms, by the action of a corresponding alkyl esterification agent on a racemic mixture or an optically active isomer of trans 3,3-dimethyl - 2-(2'-hydroxy-2'-methylpropyl)-cyclopropane-1-carboxylic acid, subjecting resulting alkyl ester to the action of a basic agent selected from the group consisting of alkali metal amides, alkali metal hydrides and alkali metal alcoholates to form the lactone of cis 3,3-dimethyl - 2 - (2' - hydroxy-2'-methylpropyl)-cyclopropane-1-carboxylic acid having the inverse configuration in position 1 to the said alkyl ester, and reacting the said lactone with a Lewis acid in the presence of a tertiary nitrogen base to form cis chrysanthemic acid in its racemic form or of the configuration (1R,2S) or of the configuration (1S,2R) depending upon whether the starting compound is racemic or of the configuration (1S,2S) or of the configuration (1R,2R).

2. The process of claim 1, wherein the alkyl esterification agent is selected from the group consisting of an alkanol of 1 to 4 carbon atoms and a diazoalkane of 1 to 4 carbon atoms.

3. The process of claim 2 wherein the alkanol is methanol.

4. The process of claim 3 wherein the methyl ester of trans 3,3-dimethyl-2S-(2'-hydroxy-2'-methylpropyl)-cyclopropane-1S-carboxylic acid is reacted with a basic agent selected from the group consisting of alkali metal amides, alkali metal hydrides and alkali metal alcoholates to form the lactone of cis 3,3-dimethyl-2S-(2'-hydroxy-2'-methylpropyl)-cyclopropane-1R-carboxylic acid which is treated with a Lewis acid in the presence of a tertiary nitrogen base to obtain d-cis chrysanthemic-(1R,2S)-acid.

5. The process of claim 1 wherein the methyl ester is formed by reacting the said trans acid of the configuration (1S,2S) with diazomethane to form the corresponding methyl ester, reacting the said methyl ester with potassium tert.-butylate in a benzene media to form the lactone of cis 3,3 - dimethyl - 2S-(2'-hydroxy-2'-methylpropyl)-cyclopropane -1R-carboxylic acid, reacting the said lactone with magnesium bromide in the presence of a tertiary nitrogen base to form the desired d-cis chrysanthemic-(1R,2S)-acid.

6. A process for the preparation of the lactone of a racemic mixture or an optically active isomer of cis 3,3 - dimethyl - 2-(2'-hydroxy-2'-methylpropyl)-cyclopropane-1-carboxylic acid comprising subjecting a racemic mixture or an optically active isomer of the alkyl ester of trans 3,3 - dimethyl - 2 - (2'-hydroxy-2'methylpropyl)-cyclopropane-1-carboxylic acid wherein the alkyl has 1 to 4 carbon atoms to the action of a basic agent selected from the group consisting of alkali metal amides, alkali metal hydrides and alkali metal alcoholates to form the corresponding lactone of a racemate or an optically active isomer of cis 3,3 - dimethyl - 2 - (2' - hydroxy-2'-methylpropyl)-cyclopropane-1-carboxylic acid whose configuration at the 1-position is inverse to that of the starting trans compound.

7. The process of claim 6 wherein the alkyl ester is the methyl ester.

8. A process for the preparation of a racemic mixture or an optically active isomer of cis chrysanthemic acid comprising subjecting a lactone of a racemic mixture or optically active isomer of cis 3,3-dimethyl-2-(2'-hydroxy-2'-methylpropyl)-cyclopropane-1-carboxylic acid to the action of a Lewis acid in the presence of a tertiary nitrogen base to form the corresponding racemic mixture or optically active isomer of cis chrysanthemic acid with same configuration at positions 1- and 2- as the starting lactone.

9. The process of claim 6 where said alkyl ester of trans 3,3-dimethyl-2-(2'-hydroxy-2'-methylpropyl)-cyclopropane-1-carboxylic acid is the methyl ester of trans 3,3 - dimethyl-2S-(2'-hydroxy-2'-methylpropyl)-cyclopropane-1S-carboxylic acid and said corresponding lactone produced is the lactone of cis - 3,3 - dimethyl-2S-(2'-hydroxy-2'-methylpropyl)-cyclopropane-1R-carboxylic acid.

References Cited

UNITED STATES PATENTS 3,527,769  9/1970  Matsui et al. _____ 260—343.5

ALEX MAZEL, Primary Examiner

A. M. T. TIGHE, Assistant Examiner

U.S. Cl. X.R.

260—468 H, 514 H

UNITED STATES PATENT OFFICE
CERTIFICATE OF CORRECTION

Patent No. 3,786,070     Dated Jan. 15, 1974

Inventor(s) JACQUES MARTEL, and JEAN BUENDIA

It is certified that error appears in the above-identified patent and that said Letters Patent are hereby corrected as shown below:

| IN THE PATENT | | APPLICATION | | |
|---|---|---|---|---|
| Col. | Line | Page | Line | |
| 4 | 5 | 8 | 8 | "0.77/" should be --0.77%-- |

| Claim | | | | |
|---|---|---|---|---|
| 9 | 49 | | | Cancel "droxy-2'-methylpropyl)-cyclopropane-1R-carboxylic" |

Signed and sealed this 30th day of July 1974.

(SEAL)
Attest:

McCOY M. GIBSON, JR.
Attesting Officer

C. MARSHALL DANN
Commissioner of Patents